United States Patent Office 3,234,155
Patented Feb. 8, 1966

3,234,155
IMIDAZOLINE-INTERNAL EPOXY COMPOUND REACTION PRODUCTS AS STABILIZERS AND PLASTICIZERS FOR POLYVINYL CHLORIDE POLYMERS AND COPOLYMERS
Elizabeth C. Dearborn, Boston, and Philip K. Isaacs, Brookline, Mass., assignors to W. R. Grace & Co., Cambridge, Mass., a corporation of Connecticut
No Drawing. Filed Oct. 11, 1960, Ser. No. 61,850
8 Claims. (Cl. 260—18)

This invention relates to vinyl resins, such as polyvinyl chloride and vinyl chloride copolymerized with other polymerizable monomers. In a particular aspect it relates to such resinous compositions which may be normally fluid at room temperature but cure or harden rapidly when heated. In a further aspect, it relates to vinyl chloride polymers and copolymers which have increased insensitivity to solvents and oils, decreased thermoplasticity, and increased adhesive properties.

It is known that polyvinyl chloride and copolymers of vinyl chloride may be modified by the addition of plasticizers, stabilizers, pigments, etc. to endow the polymers with desirable properties for specific uses and processing. In particular, plasticizers are added to the polymers to improve molding properties, increase plasticity and pliability, and augment resistance to moisture, chemicals and other conditions. Such compositions depend on the fact that the polymer is relatively insoluble in plasticizer at room temperature, yet soluble at elevated temperatures. To obtain maximum physical properties, it is necessary to fuse the compound at temperatures of about 170°–200° C. These materials are desirable because of their fast curing time, absence of water or solvent, low cost, ease of handling, and have found particular use for molding, casting films, coating and a host of others.

While plasticized compositions have gained widespread use because of their desirable attributes, they have certain deficiencies which make them unsuitable for use in many applications. One of their inherent disadvantages is the extractability of the plasticizer by oils and solvents. This obviously eliminates their application where resistance to such substances is a prime criterion. In addition, they are highly thermoplastic and lack adhesion to other than vinyl surfaces which further limits their utility.

It is known that incorporation of certain materials in these compositions will decrease their thermoplasticity, or lower the extractability of the plasticizer by strong solvents, or improve their adhesive properties. In these systems, however, the addition of such materials overcomes one or at best two drawbacks of the compositions. The use of polymerizing plasticizers, such as the glycol dimethylacrylates, reduces extraction and eliminates thermoplasticity, but they also cause hardening. Adhesion is not improved. Addition of epoxy resins and curing agents improves adhesion but extractable plasticizer is always present and the product must be used very shortly after mixing in the catalyst.

It is, therefore, an object of this invention to provide improved vinyl chloride polymer and copolymer compositions which are thermosetting, nonextractable and have improved adhesion to metals and other surfaces. This objective is realized by providing a curable composition of matter comprising vinyl chloride polymers and copolymers and the reaction product of an amino-containing imidazoline and an epoxidized compound having internal epoxy groups. The resulting compositions are stable fluids at room temperature but solidify and chemically crosslink at elevated temperatures. The cured compositions possess improved resistance to heat distortion, improved resistance to swelling and extraction by solvents, and improved adhesion to many surfaces compared to conventional polyvinyl chloride compositions while maintaining the many advantages of the fluid conventional compositions in the uncured state. The products range from a soft rubber-like material to a hard tough resin.

It has been discovered that the class of complex organic substances employed in this invention as the sole plasticizer and fluid medium for polyvinyl chloride overcomes the prior art objections to such polymeric compositions. This discovery is based on the well known fact that amines can be used as curing agents for polyvinyl chloride. The use of amines alone, however, usually causes rapid darkening and embrittlement of polyvinyl chloride. In this invention, a plasticizer-stabilizer is incorporated into an amino containing molecule to overcome these objections while still obtaining the desired cure. The plasticizer becomes attached to the amino group and reduces its tendency to extractability after cure. Of significance is the fact that after curing is effected a high degree of adhesion is realized. Moreover, the resulting vinyl resin compositions are of stable viscosity and require no catalyst for cure.

The class of compounds which accomplish the desired results consist of the fluid reaction products of an imidazoline, preferably one containing a primary amino ($-NH_2$) group, and an epoxidized compound having at least one internal epoxy group per molecule. By internal epoxy group or groups is meant that such groups are positioned inwardly at least one carbon atom away from the terminus of the molecule chain. Such compounds contain no terminal epoxy groups. When incorporated with polyvinyl chloride, this fluid prevents premature solvation of the polymer and controls degradation during heating.

For incorporation into a vinyl chloride polymer or copolymer composition, the most desirable type of imidazoline curing agent is a fluid with a plurality of imidazoline groups and which at the same time is compatible with both plasticizer and vinyl polymer. In addition, it should be capable of crosslinking the vinyl halide polymer in a very short time, e.g., the time required to flux a conventional plasticizer. 2-substituted-2-imidazolines and 1,2-disubstituted-imidazolines are excellent crosslinking agents for halogenated polymers, particularly polyvinyl chloride and its copolymers.

The most desirable imidazolines for this purpose preferably contain free primary amino groups and are represented by the following structure:

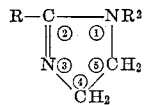

In the above, R may be (1) An alkyl chain of 1 to 36 carbon atoms derived from a carboxylic acid; or
(2) The group

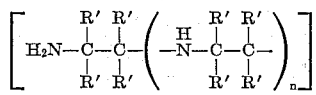

and homologues thereof where $n$ is a number from 0 to 5, and R' may be hydrogen or a hydrocarbon group such as methyl, ethyl, propyl, butyl, etc., and R² may be (1) Hydrogen; or
(2) An alkyl chain of not more than 36 carbon atoms; or
(3) The group

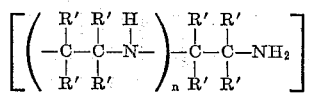

and homologues thereof where $n$ is a number from 0 to 5, and R' may be hydrogen or a hydrocarbon group such as methyl, propyl, butyl, hexyl, etc.; and
(4) Other 2-substituted-2-imidazoline or 1,2-disubstituted-2-imidazoline groups.

The amino-containing imidazoline may be prepared, for example, by reacting appropriate amounts of polyamines and mono- and/or dicarboxylic acids at reaction temperatures and pressures. Suitable polyamines are ethylene and propylene diamine, diethylene and dipropylene triamine, triethylene tetramine and tetraethylene pentamine. Suitable dicarboxylic acids are dimerized fatty acids, azelaic and sebacic acids, and monocarboxylic acids, such as oleic, pelargonic or stearic acid. The reactions are limited to the fact that the ultimate imidazoline compound must contain at least one amino group, preferably a primary amino group.

The primary amino group enables the imidazoline to subsequently combine readily with the epoxy group of the plasticizer upon re-reaction, thus regulating the activity of the imidazoline group and decreasing the extractability of the cured system. If, however, only secondary amino groups are present the reaction is slow and requires a high temperature. No discernible reaction occurs with the epoxy compound if neither primary nor secondary amino groups are present in the imidazoline compound. In the latter case, the polymer suffers from rapid overcure, viscosity instability and high extraction.

The total number of imidazoline groups in the foregoing structure should not exceed about four nor should the total molecular weight of the product exceed about 1000. If these limitations are exceeded the product will be incompatible with the other ingredients of the composition. Furthermore, if R² is a dicarboxylic acid of less than 8 carbon atoms, incompatibility will also result with the other ingredients.

While being highly effective curing agents, the use of these imidazolines alone have two basic drawbacks when added to conventional vinyl polymer systems, such as paste grade polyvinyl chloride plasticized with dioctyl phthalate. One, is the shelf life of the plastisol is greatly reduced. In effect, the imidazoline solvates the polyvinyl chloride particles so as to produce a gel instead of a fluid after storing for several days at room temperature. The second disadvantage is that the product turns black an emits HCl fumes on heating, and it is difficult to obtain a high degree of crosslinking without these signs of degradation. The invention provides a means of preventing these two side effects while maintaining the advantages of imidazoline cure. In addition, solvent resistance is improved coupled with increased crosslinking while at the same time imparting adhesive properties to the polymeric mixture.

It is known that on subjecting a given polyvinyl chloride chain to heat, a molecule of hydrogen chloride is lost and a double bond is produced. Consequently, the neighboring chlorine atom is converted to an allyl chloride with a high degree of lability. From this point progressive dehydrochlorination takes place at a fairly rapid rate causing a loss of the allylic chlorine and creating a sequence of alternating single and double bonds. The creation of the conjugated system leads to degradation of the polyvinyl chloride which is evidenced by discoloration, the depth of which is determined by the degree to which the conjugated polyene has advanced. In normal plasticized stocks, degradation is frequently accompanied by bleeding of the plasticizer.

Epoxy resins have been used to retard polyvinyl chloride resins against such degradative attack. It is the general belief that the epoxy group acts as a scavenger for the released hydrochloric acid and thus retards polymer degradation. The use of epoxy resins alone, however, does not improve thermoplasticity, extractability or adhesion.

It has been discovered that the disadvantages flowing from the use of epoxy compounds alone can be obviated by pre-reacting epoxy compounds with amino-containing imidazolines and adding the reaction products to the polymer system. Imidazolines of the foregoing structure will react smoothly on heating with epoxy compounds in which the epoxy groups are present in the interior of the molecule. A permanently fluid composition results at room temperature which, upon curing with polyvinyl chloride at elevated temperatures, causes both epoxy and amino groups to enter into the crosslinking reaction.

There are a vast number of epoxy compounds which may be used in the practice of this invention. One group embraces the epoxidized triglycerides of vegetable and marine oil fatty acids. The vegetable oils include epoxidized castor, corn, hempseed, mustard seed, olive, peanut, poppy seed, soybean, tung and walnut oil. The marine oils include epoxidized cod liver, herring, manhaden, California sardine (pilchard), Japanese sardine, gray seal and whale oil.

Another group of epoxy compounds includes epoxidized esters of ethenoid alcohols and saturated carboxylic acids. Typical alcohols include the monoethenoid monohydroxy alcohols, such as crotyl alcohol (2-buten-1-ol), oleyl alcohol, citronellol, and cinnamyl alcohol. Representative acids include the monocarboxylic and polycarboxylic acids such as acetic, caproic, pelargonic, lauric, palmitic, stearic, lignoceric, glutaric, adipic, pimelic, suberic, azelaic, phthalic and sebacic acid. Exemplary epoxidized esters falling within this group include 2,3-epoxybutyl acetate, 2,3-epoxybutyl caproate, 2,3-epoxybutyl palmitate, di(2,3-epoxybutyl)adipate, di(2,3-epoxybutyl)sebacate, 2,3-epoxycinnamyl laurate, di(2,3-epoxycinnamyl)adipate and di(2-3-epoxybutyl)phthalate.

A further group of epoxy compounds includes epoxidized esters of saturated monohydroxy and polyhydroxy alcohols and ethenoid carboxylic acids. Appropriate alcohols include methanol, ethanol, butanol, pentanol, octanol, hexadecanol, cyclopentanol, cyclohexanol, benzyl alcohol, triphenylcarbinol, ethylene glycol, propylene glycol, hexamethylene glycol, glycerol and trimethylolpropane. Suitable acids include: the monoethenoid monocarboxylic fatty acids, such as obtusilic, lauroleic, palmitoleic, oleic, elaidic and erucic acid; the polyethenoid monocarboxylic fatty acids, such as sorbic, linoleic, hiragonic, linolenic, moroctic and archidonic acid; and the substituted mono- and polyethenoid monocarboxylic acids, such as ricinoleic and licanic acid. Monoethenoid dicarboxylic acids include maleic, fumaric, itaconic and aconitic acid. Representative epoxidized esters falling under this group include lower alkyl 9,10-epoxystearate; hexadecyl 9,10-epoxystearate; cyclopentyl 9,10-epoxystearate; cyclohexyl 9,10-epoxystearate; butyl 9,10,12,13-diepoxystearate; octyl 9,10,12,13-diepoxystearate; butyl 9,10-epoxypalmitate; butyl 9,10,12,13,15,16-triepoxystearate; butyl 12-hydroxy-9,10-epoxystearate; and butyl 12-acetoxy-9,10-epoxystearate.

Still another group of epoxy compounds which are useful in this invention includes the epoxidized esters of ethenoid alcohols and ethenoid carboxylic acids. Suitable alcohols include the monoethenoid monohydroxy alcohols, asuch as crotyl, oleyl, citronellol and cinnamyl alcohol. Typical acids include: the monoethenoid monocarboxylic fatty acids, such as lauroleic, palmitoleic, oleic, elaidac and erucic acid; the polyethenoid monocarboxylic acids, such as sorbic, linoleic, hiragonic, linolenic, moroctic and arachidonic; and the substituted mono- and polyethenoid monocarboxylic acids, such as ricinoleic and licanic acid; and the monoethenoid polycarboxylic acids, such as maleic, fumaric, itaconic, aconitic and 2-octenedioc acid. Illustrative epoxidized esters which are classified under this group include 2,3-epoxybutyl-9,10-epoxypalmitate; 2,3 - epoxybutyl - 9,10 - epoxystearate; 2,3-epoxybutyl-9,10,12,13 - diepoxystearate; 2,3-epoxybutyl-9,10,12,13,15,16 - triepoxystearate; 2,3-epoxybutyl-12-hydroxy-9,10-epoxystearate; 2,3 - epoxybutyl-12-acetoxy - 9,10 - epoxystearate; 2,3 - epoxycinnamyl - 9,10-epoxypalmitate; 2,3-epoxycinnamyl - 9,10,12,13 - diepoxystearate; 2,3-epoxybutyl-2,3-epoxysuccinate; and di(2,3-epoxybutyl)-2,3-epoxyoctanoate.

Another group comprises epoxidized olefins, diolefins and polyolefins, such as epoxidized 2-butene, 2-pentene, 2-methyl-2-butene, 2-methyl-2-pentene, 2,4 - hexadiene, cyclobutene, cyclopentene, cyclohexene, cyclooctene, cyclopentadiene, and polybutadiene.

Epoxidation of the ethenoid compounds is readily obtained by use of typical epoxidizing agents, such as peracetic acid, performic acid, or hydrogen peroxide. The epoxy groups in these compounds occupy an internal position at least one carbon atom away from any terminal point on the molecule chain.

While any of the foregoing epoxy compounds are operable in this invention, the preferred compounds are the epoxidized triglycerides and the epoxidized esters of alcohols and fatty acids. Because of their bulky nature, these compounds add considerably to the molecular weight of the cured polymer.

The reaction between the amino-containing imidazolines and the epoxy compound is carried out at temperatures between about 100° C. and 190° C., and preferably between 130° C. and 150° C. at which temperatures the reaction proceeds quite readily. At temperatures lower than 100° C., the reaction is very slow and the components may be insoluble in one another. Conversely, above 190° C., the reaction is hard to control and due to its exothermic nature it may spontaneously rise at 200° C. or above and cause gelation of the mixture. The epoxy compound-imidazoline ratio may vary considerably to obtain desirable results. Generally, the imidazoline constitutes 5–50% and the epoxy compound 95–50% of the reaction product.

The product of the heat-induced reaction of the imidazoline and epoxy compound is a fluid which undergoes no further reaction at room temperature. In this way, the molecular weight of the imidazolines is increased by attaching to the bulky epoxy molecule and the curing activity on polyvinyl chloride is more controllable. These epoxy compounds are excellent plasticizers for polyvinyl chloride in which the epoxy groups help to control and even enhace crosslinking without degradation.

Contrary to the expected reaction with terminal epoxy groups, as in "Epon" resins which form a crosslinked gel, the products of reacting internally-disposed epoxy groups retain their fluid stability at room temperature. The reaction of compounds with terminal epoxy groups and imidazolines may be postulated as follows:

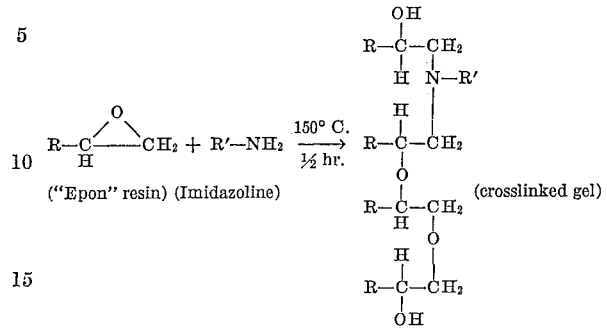

In the present invention, the sterically-hindered internal epoxy groups react in the following manner:

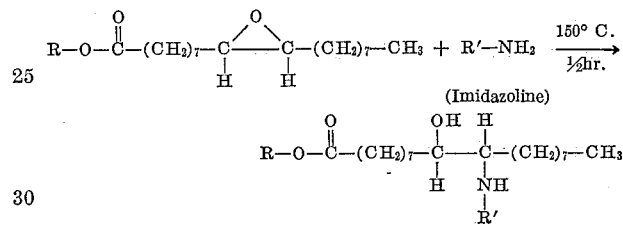

The result is that little or no crosslinking occurs with no further reaction at room tempertaure.

The profound effect of pre-reacting the imidazoline and the epoxy compound on viscosity stability is reflected in the following stable, in which the viscosity is reported in centiposes.

TABLE I

| | Pre-reaction time (hours) | | |
| --- | --- | --- | --- |
| | 1 | 2 | 3 |
| Viscosity of product at 25° C | 1,000 | 2,500 | 6,500 |
| Initial viscosity of 2 parts pre-reacted product with 1 part Geon 121 | 12,000 | 30,000 | 30,000 |
| Viscosity of mixture at 25° C. after one month | 40,000 | 32,000 | 80,000 |

The use of this reaction product as a plasticizer-stabilizer in a polyvinyl chloride resin overcomes the two aforementioned disadvantages of using an imidazoline alone.

In making the improved resinous composition, the vinyl polymer is dispersed in the pre-reacted imidazoline-epoxy compound fluid product. The pre-reacted fluid reacts with the polymer only after refluxing and heating, the reaction ceasing upon cooling. Thus, no polymerization or crosslinking takes place until the curable composition is heated at about 140–240° C. for 1 minute to 10 minutes, preferably 160–200° C. for 1 to 5 minutes. Upon heating to the softening point of the dispersed polymer, a reaction sets in leading to chemical crosslinking of the polyvinyl chloride and chemical attachment of both imidazoline and epoxy molecules thereto. The result is a highly adhesive, non-thermoplastic polymer with reduced sensitivity to solvents.

Several complex interactions are presumed to occur in the dispersion. The increased molecular weight of the pre-reacted imidazoline prevents solvation of the polyvinyl chloride at room temperature. On heating, the imidazoline groups attack the polyvinyl chloride chain, forming quaternized salts. The quaternized imidazolines yield free radicals which attack other parts of the chain, particularly the tertiary carbons at chain branches.

Any epoxy groups remaining after pre-reaction with the imidazoline react with labilized chlorine atoms near the branches to form ethers. The active chlorine is thus removed from the chain, retarding HCl loss and consequent degradation. Crosslinking proceeds by the normal free radical mechanism, by reaction of two imidazoline groups on the same molecule with adjacent polyvinyl chloride chains, by reaction with primary and secondary amino groups, and probably by reaction of the α-chloro ethers. In addition, these structures can undergo a variety of secondary reactions.

While not wishing to be bound by the validity of the above presumptions, the improved polymers provided by this invention are further illustrated by the following examples and tables. Preparation of various imidazoline-epoxy reaction products is described in the examples, the uses of which are reflected in the tables. The structures of the various imidazolines, which have been specifically applied therein, are reproduced and designated as follows in order to simplify their presentation in the examples and tables.

Imidazoline I

This compound was prepared by reacting equimolar amounts of acetic acid and triethylene tetramine for 4 hours at 150° C.–200° C. and 760–50 mm. of pressure in a nitrogen atmosphere. The reactants were previously agitated throughout the reaction and two moles of water were lost. The product was a mixture of imidazolines having the following predominant structure:

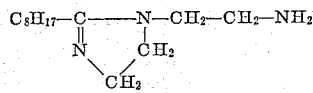

Imidazoline II

Equimolar amounts of pelargonic acid and diethylene triamine were reacted with a loss of two moles of water. The reaction conditions were the same as those used in preparing imidazoline I. The product was a mixture of imidazolines in which the following structure predominated:

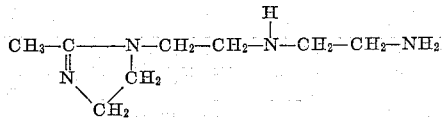

Imidazoline III 2 moles of diethylene trimaine were reacted with 1 mole of Empol 1022 resulting in a loss of 4 moles of water. (Empol 1022 is dimerized linoleic acid sold commercially by Emery Industries, Inc.) The reaction was carried out under the same conditions used in preparing imidazoline I. The product comprised a mixture of imidazolines in which the following structure predominated:

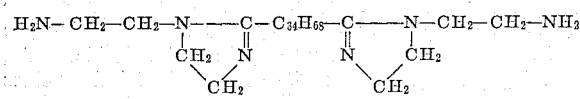

Imidazoline IV

One mole of sebacic acid, 2 moles of triethylene tetramine and 1 mole of oleic acid were reacted, resulting in a loss of 6 moles of water. The reaction was carried out for 4 hours at 150° C.–220° C. at 760–15 mm. of pressure in an atmosphere of nitrogen. The reactants were vigorously stirred throughout the reaction period. The product was a mixture of imidazolines in which the following structure was predominant:

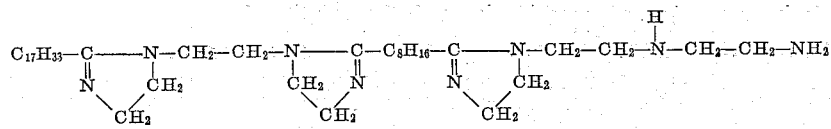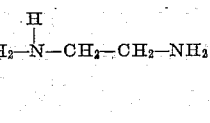

EXAMPLE 1

100 parts of each of imidazoline III and epoxidized soybean oil were mixed together at room temperature, the mixture forming a turbid fluid. It was then heated in an open vessel for 15 minutes at 185° C. accompanied by stirring. Initially, the viscosity at 25° C. was 2000 centipoises which increased to 4000 centiposes after the reaction was completed. The reaction product was a clear fluid and the viscosity remained stable at room temperature.

EXAMPLE 2

10 parts of imidazoline I and 60 parts of epoxidized soybean oil were admixed and heated in an open vessel with stirring for periods of 0, 1, 2, and 3 hours at 130° C. The effects of such heating periods are set forth in Table III.

EXAMPLE 3

1 part of imidazoline IV was admixed with 4 parts of epoxidized soybean oil to prepare two separate batches of like parts. In one batch, an epoxide having an oxirane oxygen content of 7.0% was used while the other had an oxirane oxygen content of 6.2%, the batches being referred to as 3a and 3b, respectively. Each batch was heated for one hour at 130° C. in an open vessel. The resulting reaction products, which were fluid at room temperature, appeared identical except for slight differences in viscosity.

EXAMPLE 4

1 part of imidazoline IV was mixed with 4 parts of butyl epoxystearate to prepare two separate batches of like parts. In the first batch, the epoxide had an oxirane oxygen content of 4.4% and the second had an oxirane oxygen content of 3.0%, referred to as batches 4a and 4b, respectively. Each batch was heated for one hour at 130° C. in an open vessel. The reaction products were identical in themselves but had a lower viscosity than the products of Example 3.

EXAMPLE 5

Two separate batches were prepared in which varying parts of imidazoline II and epoxidized soybean oil were used. In the first batch, 100 parts of imidazoline were mixed with 200 parts of epoxy, and in the second batch 10 parts of imidazoline were admixed with 100 parts of epoxy. The batches are designated 5a and 5b and were each heated for one-half hour at 150° C. to complete the reaction.

A series of compositions were made up in which the reaction products of Examples 1 to 5 were variously incorporated with polyvinyl chloride and copolymers of vinyl chloride. They are compared with formulations in which such reaction products were not used. The formulations and the results are set forth in the following tables:

"C," 2 hours; "B," 1 hour, all heating being carried out at 130° C. "A" represents the unheated mixture. 100

TABLE II

| Ingredient | Formulation (parts) | | | |
|---|---|---|---|---|
| | A | B[1] | C | D |
| Geon 121 (paste grade polyvinyl chloride) | 100 | 100 | 100 | 100. |
| Reaction Product of Example I | 100 | | | |
| Dioctyl phthalate | | | | 100. |
| Imidazoline III | | 50 | | |
| Epoxidized soybean oil | | 50 | 100 | |

VISCOSITY, CENTIPOISES AT 25° C.

| | | | | |
|---|---|---|---|---|
| Initial | 100,000 | 50,000 | 10,000 | 5,000. |
| After one week | 100,000 | 1,000,000+ | 10,000 | 5,000. |

EFFECTS OF HEATING FOR 5 MINUTES AT 185° C.

| | | | | |
|---|---|---|---|---|
| Color | Light brown | Dark brown | Colorless | Light yellow. |
| Odor | Mild | Acrid | Very slight oily | Slight odor of octyl alcohol. |
| Appearance | Smooth, translucent. | Blistered, opaque. | Smooth, clear | Smooth, clear. |
| Physical properties at 200° C | Solid | Solid | Flowable | Flowable. |
| Soluble in cyclohexanone | No | No | Yes | Yes. |
| Adhesion to steel | Good | Fair | Nil | Nil. |
| Percent extraction in toluene | 20 | 35 | 53 | 53. |

[1] In formulation B, the imidazoline and epoxide were not pre-reacted but were present as a physical mixture.

Analysis of the data in Table II shows that formulation A is superior in such properties as odor, solubility, adhesion, extraction by solvents and viscosity stability compared with the other formulations. The superiority is particularly striking over that of formulation B which consisted of a simple mixture of imidazoline, epoxidized plasticizer and polyvinyl chloride. The properties of formulation A make it useful as an excellent solvent resistant gasketing material and flexible printing plate.

In Table III, Geon 121 was compounded with the reaction product of Example 2. The table shows the effect of extended heating periods in carrying out the reaction between the imidazoline and epoxy material before compounding with the polyvinyl chloride. "D" represents the product obtained by heating the reactants for 3 hours; parts of each of reaction products B, C, D and unheated mixture A were combined with 100 parts of Geon 121.

TABLE III

| Product | Viscosity, Centipoises at 25° C. | | Effects of heating for 2 minutes at 200° C. | | | | Percent extraction in methylene chloride |
|---|---|---|---|---|---|---|---|
| | Initial | After One Month | Color | Odor | Appearance | Adhesion to aluminum | |
| A | (1) | | Dark brown | Oily | Blistered | Fair | 40 |
| B | 12,000 | 30,000 | Light brown | Slight | Smooth | Good | 36 |
| C | 30,000 | 32,000 | Tan | Very slight | do | Good+ | 31 |
| D | 80,000 | 80,000 | Light tan | do | do | Excellent | 20 |

[1] Incompatible.

It is noted that continued heat reaction between the imidazoline and epoxy material gives progressively higher viscosity, but progressively better viscosity stability, color, adhesion, and resistance to extraction by strong solvents. The effect of cure time and temperature on adhesion and degree of crosslinking is straightforward. The longer the reaction is permitted to continue the more tightly bound the plasticizer becomes and the whole network is crosslinked to a greater extent.

The following represents a variety of formulations in which a mixture of Geon 202 (a copolymer consisting of about 95% vinyl chloride and 5% vinylidene chloride)

and Geon 121 was compounded with various fillers and plasticizers, including the imidazoline-epoxy reaction product of this invention. The compositions and results are tabulated as follows:

TABLE IV

| Formulation | Ingredient (parts) | | | | | | | | | Percent Oxirane oxygen in plasticizer | Cured at 190° C. | | | |
|---|---|---|---|---|---|---|---|---|---|---|---|---|---|---|
| | Geon 202 | Geon 121 | Reaction Product of— | | | | Clay Filler | Dioctyl-phthalate | Imidaz-oline IV | | Approximate number of crosslinks per 10,000 molecular weight | | Percent extraction by cyclohexanone | |
| | | | Ex. 3a | Ex. 3b | Ex. 4a | Ex. 4b | | | | | 1 min. cure | 3 min. cure | 1 min. cure | 3 min. cure |
| A | 50 | 50 | 63 | | | | 37 | | | 7.0 | 1.5 | 4.0 | 10 | 8 |
| B | 50 | 50 | | 63 | | | 37 | | | 6.3 | 1.0 | 2.0 | 21 | 12 |
| C | 50 | 50 | | | 63 | | 37 | | | 3.5 | 0.7 | 1.5 | 25 | 15 |
| D | 50 | 50 | | | | 63 | 37 | | | 2.7 | 0.5 | 1.3 | 25 | 15 |
| E | 50 | 50 | | | | | | 50 | 13 | 0 | 0.7 | 0.7 | 25 | 25 |

From the foregoing table, it will be noted that the higher the oxirane content the greater the crosslinking (as determined by solvent swelling value) and the lower the solvent extraction. The very low extraction values for formulation A are probably attributable to other factors connected with the specific grade of epoxidized soybean oil used rather than its oxirane content taken alone.

TABLE V

| Formulation | Ingredient (parts) | | | | Viscosity at room temperature, centipoises | Cured at 190° C., 5 minutes | | | |
|---|---|---|---|---|---|---|---|---|---|
| | Geon 121 | Reaction Product of— | | Epoxidized soybean oil | | Color | Odor | Adhesion to Aluminum | Percent extraction in peanut oil after 24 hrs. at 100° C. |
| | | Ex. 5a | Ex. 5b | | | | | | |
| A | 100 | 100 | | | 30,000 | Dark brown | Pelargonic acid. | Excellent | 0.1 |
| B | 100 | | 100 | | 5,000 | Light brown | Very slight pelargonic acid. | Good | 6.4 |
| C | 100 | | | 100 | 3,000 | Very light tan | Slight oily | Poor | 30.0 |

The results in Table V show that both the higher and lower ratios of epoxy to imidazoline II yield a plastisol whose adhesion and oil resistance is greatly improved over a conventional plastisol based on the epoxy plasticizer and polyvinyl chloride alone. Moreover, the higher imidazoline material gives virtually no loss in oil immersion, making it ideal for use as a flowed-in, heat curable, adhesive and oil resistant gasketing material for containers. It also utility in the preparation of printing plates when oil-based inks are used.

EXAMPLE 6

10 parts of imidazoline II were mixed with 10 parts of epoxidized castor oil, then heated for 45 minutes at 150° C., and cooled. The cooled reaction product was then added to 20 parts of Geon 121. The resulting plastisol had the following properties:

TABLE VI

Viscosity at room temperature, centipoises _____ 100,000
Viscosity at room temperature after one year, centipoises _____ 100,000

*Cured 2 minutes at 185° C.*

Soluble in cyclohexanone _____ No.
Percent extraction in toluene _____ 20.
Flexibility _____ Excellent.
Adhesion to epoxy lacquer _____ Do.
Adhesion to oleoresinous lacquer _____ Good.
Adhesion to phenolic lacquer _____ Excellent.
Color _____ Red-brown.

The properties, especially the viscosity stability, make this material an excellent adhesive sealing compound for flowed-in gaskets on enameled metal containers. Insolubility in cyclohexanone indicates cured or crosslinked polymer.

EXAMPLE 7

In this example, 5 formulations were prepared, each consisting of 5 parts of imidazoline II and 10 parts of an epoxystearate lower ester. The formulations are identified by the parenthetical letter which precedes the following epoxidized esters: (A) isobutyl 12-acetoxy-9,10-epoxystearate; (B) methyl 9,10-epoxystearate; (C) ethyl 9,10-epoxystearate; (D) butyl 9,10-epoxystearate; and (E) 2-ethylhexyl 9,10-epoxystearate. These materials are commercial products prepared from mixtures consisting principally of oleates, linoleates and linolenates in which the oleate ester is predominant. Each imidazoline-ester mixture was heated for ½ hour at 150° C. and the resulting reaction product was then compounded with 15 parts of Geon 121. Properties of the final product are tabulated as follows:

TABLE VII

|  | Formulation | | | | |
|---|---|---|---|---|---|
|  | A | B | C | D | E |
| Viscosity at room temperature, centipoises | 10,000 | 10,000 | 10,000 | 10,000 | 10,000. |
| Viscosity stability at 100° C | Excellent | Excellent | Excellent | Fair | Good. |
| Cured 5 minutes at 185° C.: |  |  |  |  |  |
| Color | Light brown | Light brown | Light brown | Light brown | Light brown. |
| Soluble in cyclohexanone [1] | No | No | No | No | No. |
| Percent extraction in toluene | 20 | 20 | 20 | 20 | 20. |
| Adhesion to epoxy lacquer | Good | Poor | Good | Good | Good. |
| Adhesion to oleoresinous lacquer | Fair | do | do | do | Do. |
| Adhesion to phenolic lacquer | Good | do | do | do | Do. |
| Adhesion to tin plate | Poor |  | Fair | Fair | Fair. |

[1] Insolubility in cyclohexanone indicates cured or crosslinked polymer.

The properties make the materials of Table VII useful in flowed-in gaskets.

The following example illustrates another embodiment of this invention in which an imidazoline-epoxidized ester reaction product is composited with a copolymer consisting of about 85-88% vinyl chloride and 12-15% vinyl acetate. It is also compared with a composition containing the same copolymer compounded with separate additions of a conventional plasticizer and an imidazoline in lieu of an imidazoline-epoxy compound reaction product.

EXAMPLE 8

20 grams of Vinylite VYLF (a copolymer containing about 87% vinyl chloride and about 13% vinyl acetate) were dissolved in 80 grams of methyl ethyl ketone. The resulting solution was split into two equal portions of 50 grams each, designated as "A" and "B," with each portion containing 10 grams of copolymer. Into portion "A," there were then separately added 1 gram of imidazoline IV and 3 grams of dioctyl phthalate. 4 grams of the reaction product of Example 3 were added to portion "B." Both portions were then baked at 200° C. and the results of such heat treatment are reported as follows:

|  | Portion A | Portion B |
|---|---|---|
| Minutes required to attain insolubility in methyl ethyl ketone | 2 | 1 |
| Minutes required to blacken at 200° C | 2 | 4 |

It is noted that in the absence of the epoxy compound-imidazoline reaction product in the composition, portion "A" blackened and degraded by the time it became insoluble (crosslinked). On the other hand, portion "B," which contained the reaction product, provided a safety factor of about 3 minutes between crosslinking and degradation. The same results are obtainable with extrusion grade resins. The properties of portion "B" render it useful as a protective coating for contact with organic solvents or corrosive environments.

Example 9 shows the use of a product obtained by reacting an imidazoline and an epoxide known commercially as Epoxide 201. The epoxide has the structure

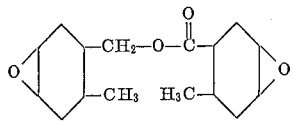

(3,4-epoxy-6-methylcyclohexylmethyl 3,4-epoxy-6-methylcyclohexanecarboxylate)

EXAMPLE 9

20 parts of imidazoline IV and 60 parts of Epoxide 201 were reacted for one hour at 130° C. to give a reaction product which was a clear, slightly viscous fluid and stable at room temperature. 40 parts of this product were then compounded with 40 parts of Geon 121 and 10 parts of dioctyl phthalate. The properties of this composition were as follows:

Viscosity, centipoises

Initial at 75° F. _____ 6,000
After 2 days _____ 6,000

Cured 2 minutes at 400° F.

Color _____ Reddish tan.
Effect of cyclohexanone _____ Some swelling.
Adhesion to aluminum _____ Excellent.
Shore A hardness _____ 60.

It is apparent that the described reaction product promotes very rapid crosslinking without appreciable degradation and affords excellent adhesive properties while exhibiting viscosity stability at room temperature.

Example 10 demonstrates the use of an epoxidized polyolefin in this invention.

EXAMPLE 10

20 parts of imidazoline IV and 60 parts of Oxiron 2001 were reacted for one hour at 130° C. The resulting reaction product was a clear, viscous fluid which was stable at room temperature. (Oxiron 2001 is a product of Food Machinery and Chemicals Company and is identified as epoxidized polybutadiene.)

40 parts of the imidazoline-Oxiron 2001 reaction product were composited with 40 parts of Geon 121 and 10 parts of dioctyl phthalate. Properties of this composition were as follows:

Viscosity, centipoises

Initial at 75° F. _____ 23,000
After 2 days _____ 23,000

Cured 2 minutes at 400° F.

Color _____ Reddish tan.
Effect of cyclohexanone _____ Some swelling.
Adhesion to aluminum _____ Excellent.
Shore A hardness _____ 50.

The polymers to which this invention is particularly applicable are straight polyvinyl chloride and vinyl chloride copolymerized with another polymerizable monomer in which vinyl chloride may constitute about 50% of the copolymer. Polyvinyl chloride is not readily dissolved by most organic solvents and is blended to various plasticizers with difficulty. The copolymer with vinyl acetate, for example, is much more compatible with plasticizer than straight polyvinyl chloride. Most of the vinyl chloride copolymers are high in vinyl chloride, usually better than 80%, the 87-13% vinyl chloride-vinyl acetate combination being preferred for many applications. Other exemplary copolymers consist of 5% vinylidene chloride and 95% vinyl chloride; 3% vinyl acetate and 97% vinyl chloride; 5% dibutyl maleate and 95% vinyl chloride; 5% vinyl laurate and 95% vinyl chloride;

and vinyl chloride copolymerized with a host of other polymerizable vinyl esters.

The proportions of the components in the final compositions may be varied over wide limits, depending upon the type of processing to be used, for example, extrusion, molding, calendering and the properties desired. In addition, various other materials may be added, such as colors and fillers. The imidazoline may constitute from .10% to 50% by weight of the composition, preferably from 2 to 20%; the epoxidized ester from 10 to 80%, preferably from 20 to 60%; and the polyvinyl chloride from 10 to 70%, preferably from 20 to 60%. The oxirane oxygen content of the epoxidized ester is generally between about 3 and 7.5% by weight, preferably 6 to 7%.

As used herein, all "parts" and "percentages" are expressed on a weight basis.

We claim:

1. A curable composition comprising (1) a polymeric material selected from the group consisting of polyvinyl chloride and 50% to 97% of vinyl chloride copolymerized with 3% to 50% of another polymerizable monomer selected from the group consisting of vinyl esters, vinylidene chloride and dibutyl maleate, and (2) the product derived by reacting at a temperature between about 100° C. and 190° C.:

(I) 50% to 95% of an epoxy compound which is devoid of terminal epoxy groups; and (II) 5% to 50% of an imidazoline of a molecular weight not exceeding 1000 and having the formula

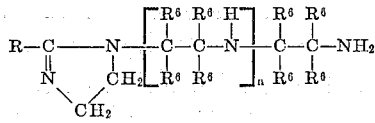

where R is a member selected from the class consisting of (A) an alkyl group containing 1 to 36 carbon atoms, and (B) the group

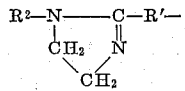

where R' is a divalent hydrocarbon radical containing 8 to 34 carbon atoms, and $R^2$ represents a member of the class consisting of the group (B1) 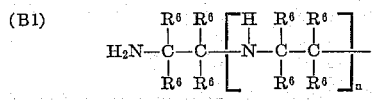

and (B2) 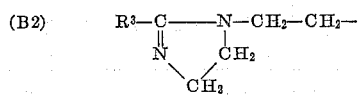

where $R^3$ represents a member selected from the class consisting of (a) an alkyl group containing 1 to 36 carbon atoms, and (b) the group

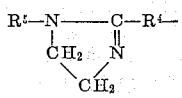

where $R^4$ is a divalent hydrocarbon radical containing 8 to 34 carbon atoms; and $R^5$ represents a member selected from the class consisting of (b1) hydrogen;

(b2) an alkyl group containing 1 to 6 carbon atoms, and (b3) the group

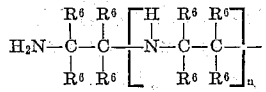

where $R^6$ is a member selected from the class consisting of hydrogen and an alkyl radical containing 1 to 6 carbon atoms, and $n$ has one of the values 0 to 5.

2. A polymer obtained by curing the composition of claim 1 by heating at a temperature between 140° C. and 240° C. for 1 to 10 minutes.

3. A curable composition according to claim 1 wherein the epoxy compound is selected from the group consisting of epoxidized triglycerides of fatty oil acids; epoxidized esters of ethernoid alcohols and saturated carboxylic acids; epoxidized esters of saturated alcohols and ethenoid carboxylic acids; epoxidized esters of ethenoid alcohols and ethenoid carboxylic acids; an epoxidized olefin selected from the group consisting of monoolefins, diolefins and polymeric olefins; and 3,4-epoxy-6-methylcyclohexylmethyl 3,4-epoxy-6-methylcyclohexane-carboxylate.

4. A composition according to claim 3 wherein the epoxy compound is epoxidized soybean oil.

5. A composition according to claim 3 wherein the epoxy compound is epoxidized castor oil.

6. A composition according to claim 3 wherein the epoxy compound is an epoxystearate lower ester.

7. A composition according to claim 3 wherein the epoxy compound is epoxidized polybutadiene.

8. A polymer obtained by heating the composition of claim 3 for 1 to 10 minutes at 140° C. to 240° C.

References Cited by the Examiner

UNITED STATES PATENTS

| | | | |
|---|---|---|---|
| 2,779,771 | 1/1957 | Phillips et al. | 260—45.8 |
| 2,878,233 | 3/1959 | Harrison | 260—309.6 |
| 2,894,923 | 7/1959 | Graham | 260—23 X |
| 2,994,685 | 8/1961 | Delmonte et al. | 260—47 |
| 3,050,527 | 8/1962 | Dearborne et al. | 260—23 XR |
| 3,065,247 | 11/1962 | De Groote et al. | 260—18 |

LEON J. BERCOVITZ, *Primary Examiner.*

ALPHONSO D. SULLIVAN, *Examiner.*